(12) United States Patent
Chang

(10) Patent No.: US 10,749,397 B2
(45) Date of Patent: Aug. 18, 2020

(54) BRUSHLESS DC DYNAMO

(71) Applicant: Chun-Jong Chang, Hsinchu County (TW)

(72) Inventor: Chun-Jong Chang, Hsinchu County (TW)

(*) Notice: Subject to any disclaimer, the term of this patent is extended or adjusted under 35 U.S.C. 154(b) by 361 days.

(21) Appl. No.: 15/965,844

(22) Filed: Apr. 28, 2018

(65) Prior Publication Data

US 2018/0323668 A1 Nov. 8, 2018

(30) Foreign Application Priority Data

May 4, 2017 (TW) .............................. 106114860 A
May 4, 2017 (TW) .............................. 106206325 A

(51) Int. Cl.

| | |
|---|---|
| *H02K 3/28* | (2006.01) |
| *H02K 11/21* | (2016.01) |
| *H02K 19/16* | (2006.01) |
| *H02K 29/00* | (2006.01) |
| *H02K 11/30* | (2016.01) |
| H02K 29/06 | (2006.01) |

(52) U.S. Cl.
CPC .............. *H02K 3/28* (2013.01); *H02K 11/21* (2016.01); *H02K 11/30* (2016.01); *H02K 19/16* (2013.01); *H02K 29/00* (2013.01); *H02K 29/06* (2013.01)

(58) Field of Classification Search
CPC ....................................................... H02K 3/28
See application file for complete search history.

(56) References Cited

U.S. PATENT DOCUMENTS

| 7,439,697 B2* | 10/2008 | Miyazaki | ................ H02M 7/48 318/400.41 |
|---|---|---|---|
| 8,860,277 B2* | 10/2014 | Kimiabeigi | .............. H02K 3/18 310/179 |
| 9,225,215 B2* | 12/2015 | Asano | ....................... H02K 3/12 |
| 2018/0323668 A1* | 11/2018 | Chang | .................... H02K 11/30 |

* cited by examiner

*Primary Examiner* — Dang D Le

(57) ABSTRACT

A brushless DC dynamo includes a circular armature with N sets of first armature coils spaced with each other in sequence, N sets of second armature coils spaced with each other in sequence, a plurality of first wires and a plurality of second wires, and each first wire and each second wire respectively interconnecting between one set of the first armature coils and one set of the second armature coils; a control unit; a magnetic unit, disposed inside the circular armature unit, comprising a pair of magnetic poles, wherein the circular armature unit and the magnetic unit can rotate relatively to each other under control; and a position sensor for detecting the position of the magnetic unit, and outputting the information of magnetic unit's position to the control unit to trigger the control unit to output a control signal to control the first and second control switches.

14 Claims, 10 Drawing Sheets

BRUSHLESS DC DYNAMO

This application claims the benefit of TW invention patent application No. 106114860, filed on May 4, 2017, and TW utility model patent application No. 106206325, filed on May 4, 2017, and the entirety of which is incorporated by reference herein.

BACKGROUND OF THE INVENTION

Field of the Invention

The present invention relates to a DC dynamo and in particular relates to a brushless DC dynamo.

Description of the Related Art

A conventional DC dynamo usually includes brushes and commutators (i.e. rectifier) to always keep the magnetic field of the rotor perpendicular to the magnetic field of the stator during rotation to generate a greatest torque. Meanwhile, the DC dynamos continuously head the lists of rotation speed controlling and servo controlling fields owing to advantages of voltage proportion to the rotation speed and hence naturally easy to control. The brushless DC dynamo (BLDC dynamo) is now very popular in the market, which has a structure like a permanent-magnet variable frequency synchronous AC dynamo, wherein the rotatable angle of the stator is determined by a so-called multiple phase magnetic field, for example three phases magnetic field, thus the permanent rotor can be rotated by a magnetic field with variable rotation velocities to serve as a motor; or, the electromotive force induced by a permanent rotor can be transformed into AC power by a multiphase coil, such as a three phase coil, to serve as a generator. However, the VVVF control method of state-of-the-art BLDC is too complex and unnatural, so a novel brushless DC dynamo with a working mode more close to that of the convention DC dynamo is highly expected.

SUMMARY OF THE INVENTION

According to this present invention, the commutators used in the conventional brush DC dynamo are replaced with semiconductor switches, wherein the periodically mechanical contact of the armature and different electrodes are replaced with static electronic switching array to periodically switch electrically without any mechanical contact switching between the armature and electrodes. Meanwhile, the armature can work as conventional mode to always maintain the distribution of the armature current such that the magnetic field of the rotor is perpendicular to the magnetic field of the stator during rotating, and the damage of switched contacts caused by mechanical contact of the armature and electrodes can be avoided.

A feature of this invention provides a brushless DC dynamo, comprising: a circular armature, comprising: N sets of first armature coils spaced with each other in sequence, and the first set of first armature coil is adjacent to the Nth set of first armature coil and joined with each other; N sets of second armature coils spaced with each other in sequence, and the first set of second armature coil is adjacent to the Nth set of second armature coil and joined with each other, wherein the N sets of second armature coils are located outside of the N sets of first armature coils; and a plurality of first wires and a plurality of second wires, and each first wire and each second wire respectively interconnecting between one set of the first armature coils and one set of the second armature coils; wherein, N is a natural number greater than 2, and the (i+1)th set of first armature coil is interconnected to the (i+1)th set of second armature coil by the (i+1)th first wire, and the (i+1)th set of first armature coil is interconnected to the (i+2)th set of second armature coil by the (i+1)th second wire, $1 \leq (i) \leq N-2$, and the first set of first armature coil is interconnected to the first set of second armature coil by the 1st first wire, and the first set of first armature coil is interconnected to the second set of second armature coil by the 1st second wire, and the Nth set of first armature coil is interconnected to the Nth set of second armature coil by the Nth first wire, and the Nth set of first armature coil is interconnected to the first set of first armature coil by the Nth second wire; a control unit, comprising N first control switches and N second control switches, wherein the (j)th first control switch is interconnect between a first polarity DC power source and a (j)th second wire, and the (j)th second control switch is interconnected between a second polarity DC power source with a polarity opposite to the first polarity DC power and a (j)th second wire, wherein (j) is a natural number, and $1 \leq (j) \leq N$; a magnetic unit, disposed inside the circular armature unit, comprising a pair of magnetic poles, wherein the circular armature unit and the magnetic unit can rotate relatively to each other under control; and a position sensor for detecting the position of the magnetic unit, and outputting the information of magnetic unit's position to the control unit to trigger the control unit to output a control signal to control on or off of the first and second control switches.

Another feature of this invention provide a brushless DC dynamo as mentioned above, wherein the magnetic unit is a permanent magnet or an electromagnet.

Another feature of this invention provide a brushless DC dynamo as mentioned above, wherein the position sensor is a resolver, an encoder, a Hall sensor, a photointerrupter or a photoelectric sensor.

Another feature of this invention provide a brushless DC dynamo as mentioned above, further comprising a first snubber disposed between the first DC polarity power source and the first control switches, and a second snubber disposed between the second DC polarity power source and the second control switches.

Another feature of this invention provide a brushless DC dynamo as mentioned above, wherein the first armature coils and the second armature coils are manufactured by wave winding, lap winding or frog-leg winding.

Another feature of this invention provide a brushless DC dynamo as mentioned above, wherein the circular armature unit is a circular stator, and the magnetic unit is a magnetic rotor.

Another feature of this invention provide a brushless DC dynamo as mentioned above, wherein the circular armature unit is a circular rotor, and the magnetic unit is a magnetic stator.

Another feature of this invention provide another brushless DC dynamo, comprising: a first circular armature unit, comprising M second circular armature units connected in series, M is a natural number no less than 2, and each second circular armature units comprising: N sets of first armature coils spaced with each other in sequence, and the first set of first armature coil is adjacent to the Nth set of first armature coil and joined with each other; N sets of second armature coils spaced with each other, and the first set of second armature coil is adjacent to the Nth set of second armature coil and joined with each other, wherein the N set of second armature coils are located outside of the N sets of first armature coils; and a plurality of first wires and a plurality of second wires, and each first wire and each second wire respectively interconnecting between one set of the first armature coils and one set of the second armature coils; wherein, N is a natural number greater than 2, and the (i+1)th set of first armature coil is interconnected to the (i+1)th set of second armature coil by the (i+1)th first wire, and the (i+1)th set of first armature coil is interconnected to the (i+2)th set of second armature coil by the (i+1)th second wire, $1 \leq (i) \leq N-2$, and the first set of first armature coil is interconnected to the first set of second armature coil by the 1st first wire, and the first set of first armature coil is interconnected to the second set of second armature coil by the 1st second wire, and the Nth set of first armature coil is interconnected to the Nth set of second armature coil by the Nth first wire, and the Nth set of first armature coil is interconnected to the first set of first armature coil by the Nth second wire; 2M control units, each control unit corresponding to one of the second circular armature units and comprising N first control switches and N second control switches, wherein the (j)th first control switch is interconnected between a first polarity DC power source and a (j)th second wire of a second circular armature unit corresponding to the (j)th first control switch, and the (j)th second control switch is interconnected between a second polarity DC power source with a polarity opposite to the first polarity DC power and a (j)th second wire of a second circular armature unit corresponding to the (j)th second control switch, wherein (j) is a natural number, and $1 \leq (j) \leq N$; a magnetic unit, disposed inside the first circular armature unit, comprising M pairs of magnetic poles, wherein the first circular armature unit and the magnetic unit can rotate relatively to each other under control; and a position sensor for detecting the position of the magnetic unit, and outputting the information of magnetic unit's position to the control unit to trigger the control unit to output a control signal to control on or off of the first and second control switches.

Another feature of this invention provide a brushless DC dynamo as mentioned above, wherein the magnetic unit is a permanent magnet or an electromagnet.

Another feature of this invention provide a brushless DC dynamo as mentioned above, wherein the position sensor is a resolver, an encoder, a Hall sensor, a photo-interrupter or a photoelectric sensor.

Another feature of this invention provide a brushless DC dynamo as mentioned above, further comprising a first snubber disposed between the first DC polarity power source and the first control switches, and a second snubber disposed between the second DC polarity power source and the second control switches.

Another feature of this invention provide a brushless DC dynamo as mentioned above, wherein the first armature coils and the second armature coils are manufactured by wave winding, lap winding or frog-leg winding.

Another feature of this invention provide a brushless DC dynamo as mentioned above, wherein the first circular armature unit is a circular stator, and the magnetic unit is a magnetic rotor.

Another feature of this invention provide a brushless DC dynamo as mentioned above, wherein the first circular armature unit is a circular rotor, and the magnetic unit is a magnetic stator.

According to this present invention, the commutators used in the conventional brush DC dynamo are replaced with semiconductor switches, wherein the periodically mechanical contact of the armature and different electrodes are replaced with static electronic switching array to periodically switch without any contact of the armature and electrodes. Meanwhile, the armature can work as conventional mode to maintain the distribution of the armature current when the magnetic field of the rotor is perpendicular to the magnetic field of the stator during rotating, and the damage of switch contacts caused by mechanical contact of the armature and electrodes can be avoided.

The making and using of the embodiments of the present disclosure are discussed in detail below. However, it should be noted that the embodiments provide many applicable inventive concepts that can be embodied in a variety of specific methods. The specific exemplary embodiments discussed are merely illustrative of specific methods to make and use the embodiments, and do not limit the scope of the disclosure.

DETAILED DESCRIPTION OF THE INVENTION

Exemplary Embodiment 1

Figure 1:
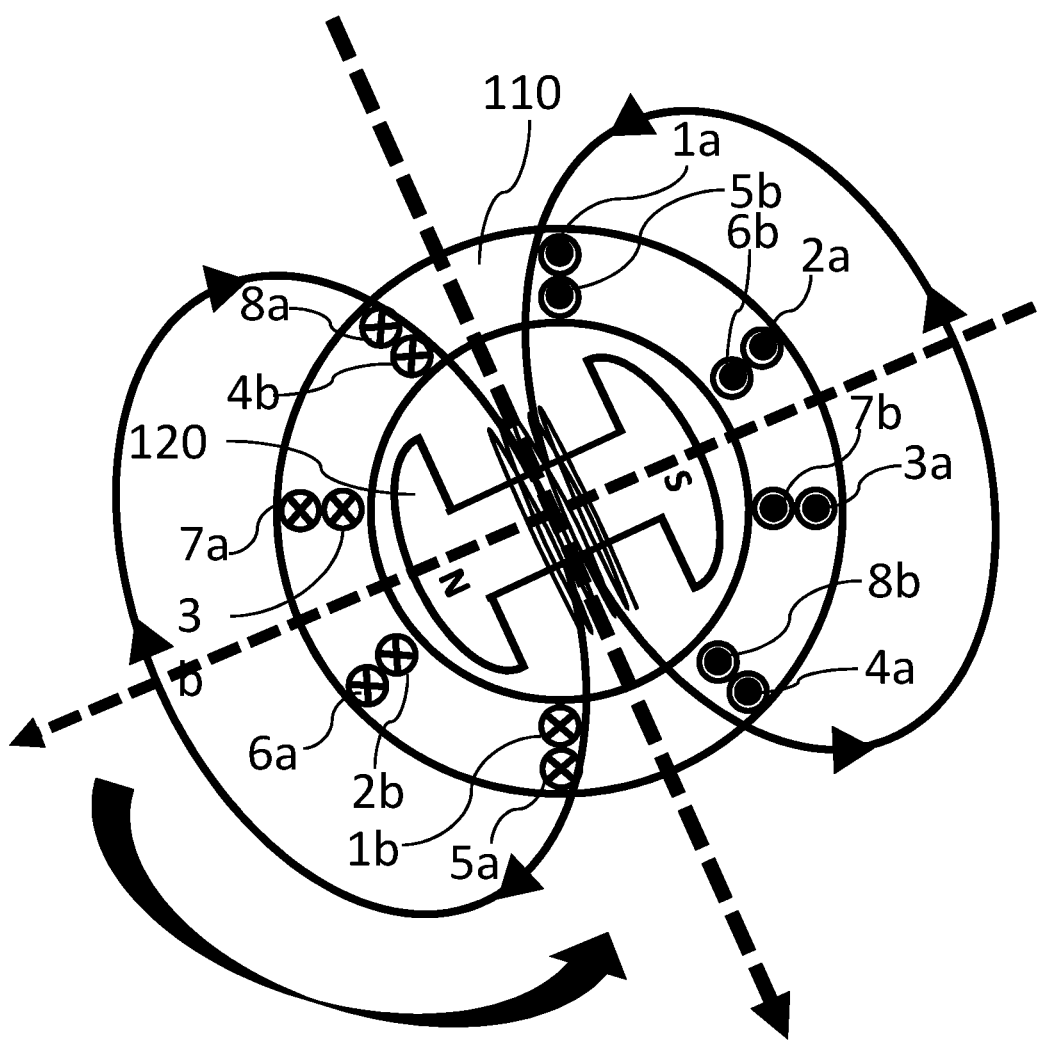
FIGS. 1~3 are schematic drawings of the dynamo 100 of the embodiment 1 according to this present invention on different operation stages.

First, please refer to FIG. 1. As showing in FIG. 1, a brushless DC dynamo 100 of embodiment 1 according to this present invention is illustrated. The brushless DC dynamo 100 comprises a circular armature 110 and a magnetic unit 120 consisted of a permanent magnet or an electromagnet, disposed inside the circular armature unit 110. The magnetic unit 120 comprises a pair of magnetic poles consisted of N pole and S pole locating on opposite side of the magnetic unit. The circular armature unit 110 and the magnetic unit 120 can rotate relatively to each other under control. In this embodiment, the magnetic unit 120 is a rotor and the circular armature 110 is a stator, so the magnetic unit 120 can rotate relatively to the circular armature 110 under control. In another embodiment of this invention, the magnetic unit 120 is a stator and the circular armature 110 is a rotor, so the circular armature 110 can rotate relatively to the magnetic unit 120.

As shown in FIG. 1, an armature coil with eight slots is taken as an example to explain this embodiment. The circular armature unit 110 comprises 8 sets of first armature coils (1b, 2b, 3b, 4b, 5b, 6b, 7b and 8b) spaced with each other in sequence and the first set of first armature coil 1b is adjacent to the 8th set of first armature coil 8b and joined with each other, and 8 sets of second armature coils (1a, 2a, 3a, 4a, 5a, 6a, 7a and 8a) spaced with each other in sequence and the first set of second armature coil 1a is adjacent to the 8th set of second armature coil 8a and joined with each other, wherein eight sets of second armature coils (1a, 2a, 3a, 4a, 5a, 6a, 7a and 8a) are located outside of the eight sets of first armature coils (1b, 2b, 3b, 4b, 5b, 6b, 7b and 8b). The first armature coils (1b, 2b, 3b, 4b, 5b, 6b, 7b and 8b) and the second armature coils (1a, 2a, 3a, 4a, 5a, 6a, 7a and 8a) are manufactured by for example but not limited to wave winding, lap winding or frog-leg winding.

Figure 4:
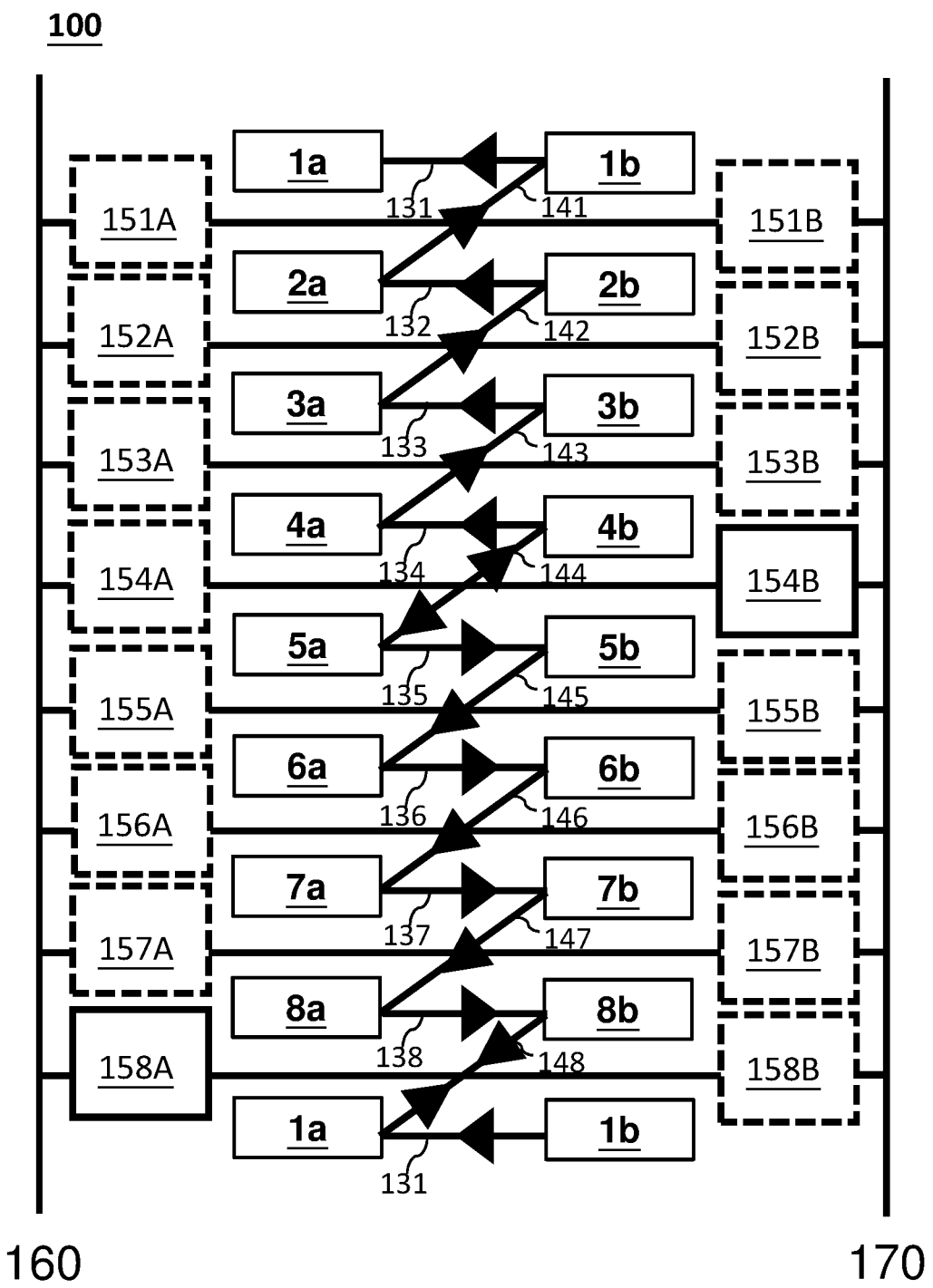
FIG. 4 is the equivalent circuit diagram corresponding to FIG. 1.

Next, please refer to FIG. 4 which is an equivalent circuit diagram corresponding to FIG. 1. As showing in FIG. 4, the brushless DC dynamo 100 further comprises a plurality of first wires 131~138 and a plurality of second wires 141~148, respectively interconnecting between the first armature coils (1b, 2b, 3b, 4b, 5b, 6b, 7b and 8b) and the second armature coils (1a, 2a, 3a, 4a, 5a, 6a, 7a and 8a), wherein the second set of first armature coil 2b is interconnected to the second set of second armature coil 2a by the 2nd first wire 132, and the second set of first armature coil 2b is interconnected to the third set of second armature coil 3a by the 2nd second wire 142; the third set of first armature coil 3b is interconnected to the third set of second armature coil 3a by the 3rd first wire 133, and the third set of first armature coil 3b is interconnected to the fourth set of second armature coil 4a by the 3rd second wire 143; the fourth set of first armature coil 4b is interconnected to the fourth set of second armature coil 4a by the 4th first wire 134, and the fourth set of first armature coil 4b is interconnected to the fifth set of second armature coil 5a by the 4th second wire 144; the fifth set of first armature coil 5b is interconnected to the fifth set of second armature coil 5a by the 5th first wire 135, and the fifth set of first armature coil 5b is interconnected to the sixth set of second armature coil 6a by the 5th second wire 145; the sixth set of first armature coil 6b is interconnected to the sixth set of second armature coil 6a by the 6th first wire 136, and the sixth set of first armature coil 6b is interconnected to the seventh set of second armature coil 7a by the 6th second wire 146; the seventh set of first armature coil 7b is interconnected to the seventh set of second armature coil 7a by the 7th first wire 137, and the seventh set of first armature coil 7b is interconnected to the eighth set of second armature coil 8a by the 7th second wire 147; the eighth set of first armature coil 8b is interconnected to the eighth set of second armature coil 8a by the 8th first wire 138, and the eighth set of first armature coil 8b is interconnected to the first set of second armature coil 1a by the 8th second wire 148.

In another embodiments of this invention, the circular armature unit 110 can comprise N sets of second armature coils spaced with each other in sequence, and the first set of second armature coil is adjacent to the Nth set of second armature coil and joined with each other, wherein the N sets of second armature coils are located outside of the N sets of first armature coils; and a plurality of first wires and a plurality of second wires, and each first wire and each second wire respectively interconnecting between one set of the first armature coils and one set of the second armature coils; wherein, N is a natural number greater than 2, and the (i+1)th set of first armature coil is interconnected to the (i+1)th set of second armature coil by the (i+1)th first wire, and the (i+1)th set of first armature coil is interconnected to the (i+2)th set of second armature coil by the (i+1)th second wire, $1 \leq (i) \leq N-2$, and the first set of first armature coil is interconnected to the first set of second armature coil by the 1st first wire, and the first set of first armature coil is interconnected to the second set of second armature coil by the 1st second wire, and the Nth set of first armature coil is interconnected to the Nth set of second armature coil by the Nth first wire, and the Nth set of first armature coil is interconnected to the first set of first armature coil by the Nth second wire.

In addition, as shown in FIG. 4, the brushless DC dynamo can further comprises a control unit (not labeled) comprising eight first control switches 151A~158A, and eight second control switches 151B~158B, wherein the first control switch 151A is interconnected between the first polarity DC power source 160 and the 1st second wire 141, and theist second control switch 151B is interconnected between the second polarity DC power source 170 and the 1st second wire 141; the second control switch 152A is interconnected between the first polarity DC power source 160 and the 2nd second wire 142, and the second control switch 152B is interconnected between the second polarity DC power source 170 and the 2nd second wire 142; the third control switch 153A is interconnected between the first polarity DC power source 160 and the 3rd second wire 143, and the 3rd second control switch 153B is interconnected between the second polarity DC power source 170 and the 3rd second wire 143; the fourth control switch 154A is interconnected between the first polarity DC power source 160 and the 4th second wire 144, and the 4th second control switch 154B is interconnected between the second polarity DC power source 170 and the 4th second wire 144; the fifth control switch 155A is interconnected between the first polarity DC power source 160 and the 5th second wire 145, and the 5th second control switch 155B is interconnected between the second polarity DC power source 170 and the 5th second wire 145; the sixth control switch 156A is interconnected between the first polarity DC power source 160 and the 6th second wire 146, and the 6th second control switch 156B is interconnected between the second polarity DC power source 170 and the 6th second wire 146; the seventh control switch 157A is interconnected between the first polarity DC power source 160 and the 7th second wire 147, and the 7th second control switch 157B is interconnected between the second polarity DC power source 170 and the 7th second wire 147; and the eighth control switch 158A is interconnected between the first polarity DC power source 160 and the 8th second wire 148, and the 8th second control switch 158B is interconnected between the second polarity DC power source 170 and the 8th second wire 148. The first polarity DC power source 160 and the second polarity DC power source 170 are of different polarities.

In another embodiments of this invention, the circular armature unit 119 can comprise N sets of first armature coils spaced with each other in sequence, and the first set of first armature coil is adjacent to the Nth set of first armature coil and joined with each other, and N sets of second armature coils spaced with each other in sequence, and the first set of second armature coil is adjacent to the Nth set of second armature coil and joined with each other, wherein the N sets of second armature coils are located outside of the N sets of first armature coils, and a control unit, comprising N first control switches and N second control switches, wherein the (j)th first control switch is interconnect between a first polarity DC power source and a (j)th second wire, and the (j)th second control switch is interconnected between a second polarity DC power source with a polarity opposite to the first polarity DC power and a (j)th second wire, wherein (j) is a natural number, and $1 \leq (j) \leq N$.

The brushless DC dynamo 100 further comprises a position sensor (not shown) for detecting the position of the magnetic unit 120, and outputting the information of magnetic unit's position to the control unit (not labeled) to trigger the control unit to output a control signal to control on or off of the first control switches (151A~158A) and second control switches (151B~158B). The position sensor can be a resolver, an encoder, a Hall sensor, a photo-interrupter or a photoelectric sensor.

As shown in FIG. 4, when the 4th second control switch 154B interconnecting between the second polarity DC power source 170 and the 4th second wire 144 is switched on, the direction of the current within the 4th second wire 144 will be inverted like a commutator is interconnected to the 4th second wire 144, wherein the direction of the current in the fourth set of the first armature coil 4b will be changed from emitting out of the surface of the circular armature unit 110 to emitting into the surface of the circular armature unit 110, and the direction of the current in the fifth set of the second armature coil 5a will be changed from emitting out of the surface of the circular armature unit 110 to emitting into the surface of the circular armature unit 110. Similarly, as shown in FIG. 4, when the 8th first control switch 158A interconnecting between the first polarity DC power source 160 and the 8th second wire 148 is switched on, the direction of the current within the 8th second wire 148 will be inverted like a commutator is interconnected to the 8th second wire 148, wherein the direction of the current in the eighth set of the first armature coil 8b will be changed from emitting into the surface of the circular armature unit 110 to emitting out of the surface of the circular armature unit 110, and the direction of the current in the first set of the second armature coil 1a will be changed from emitting into the surface of the circular armature unit 110 to emitting out of the surface of the circular armature unit 110. Accordingly, the magnetic unit 120 shown in the FIG. 2 of this embodiment can rotate relatively to the circular armature unit 110 owing to the change of the torque.

Figure 2:
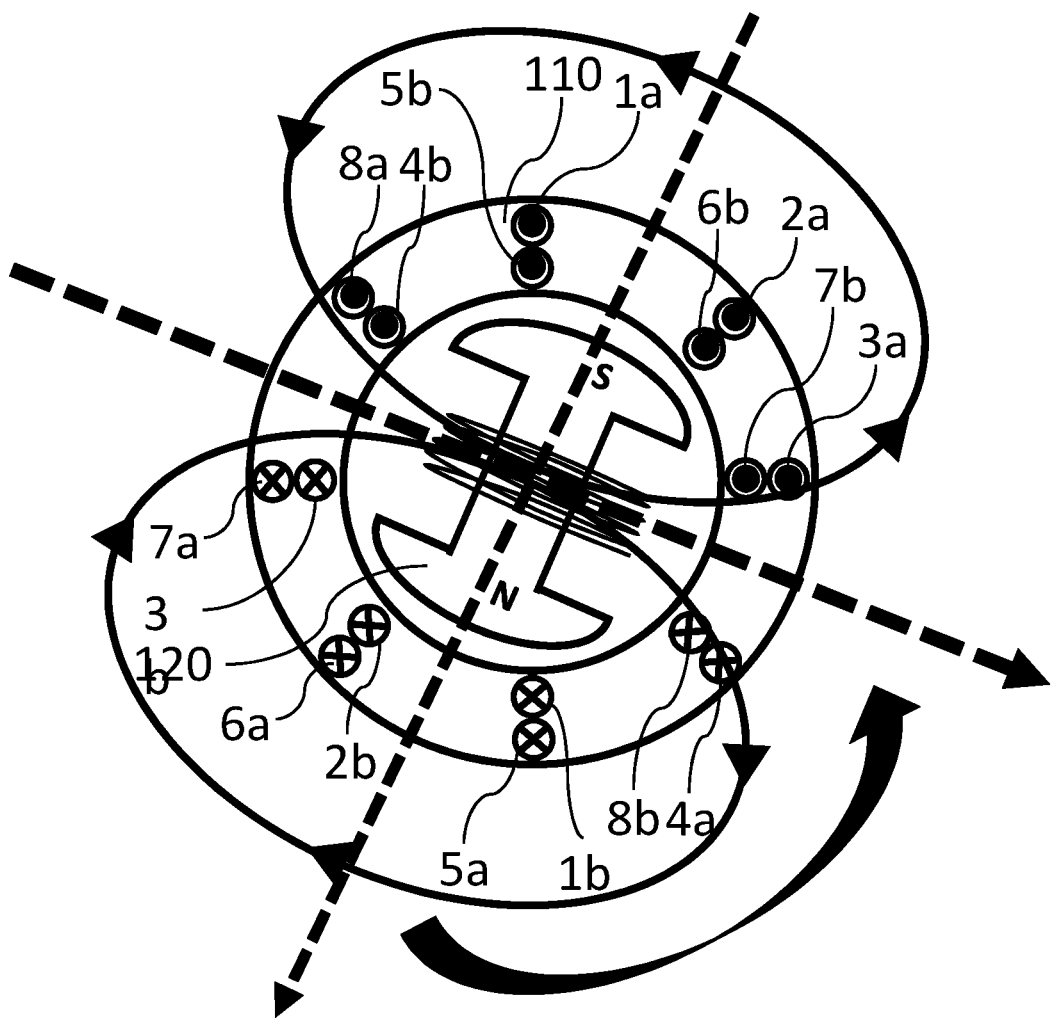
Figure 5:
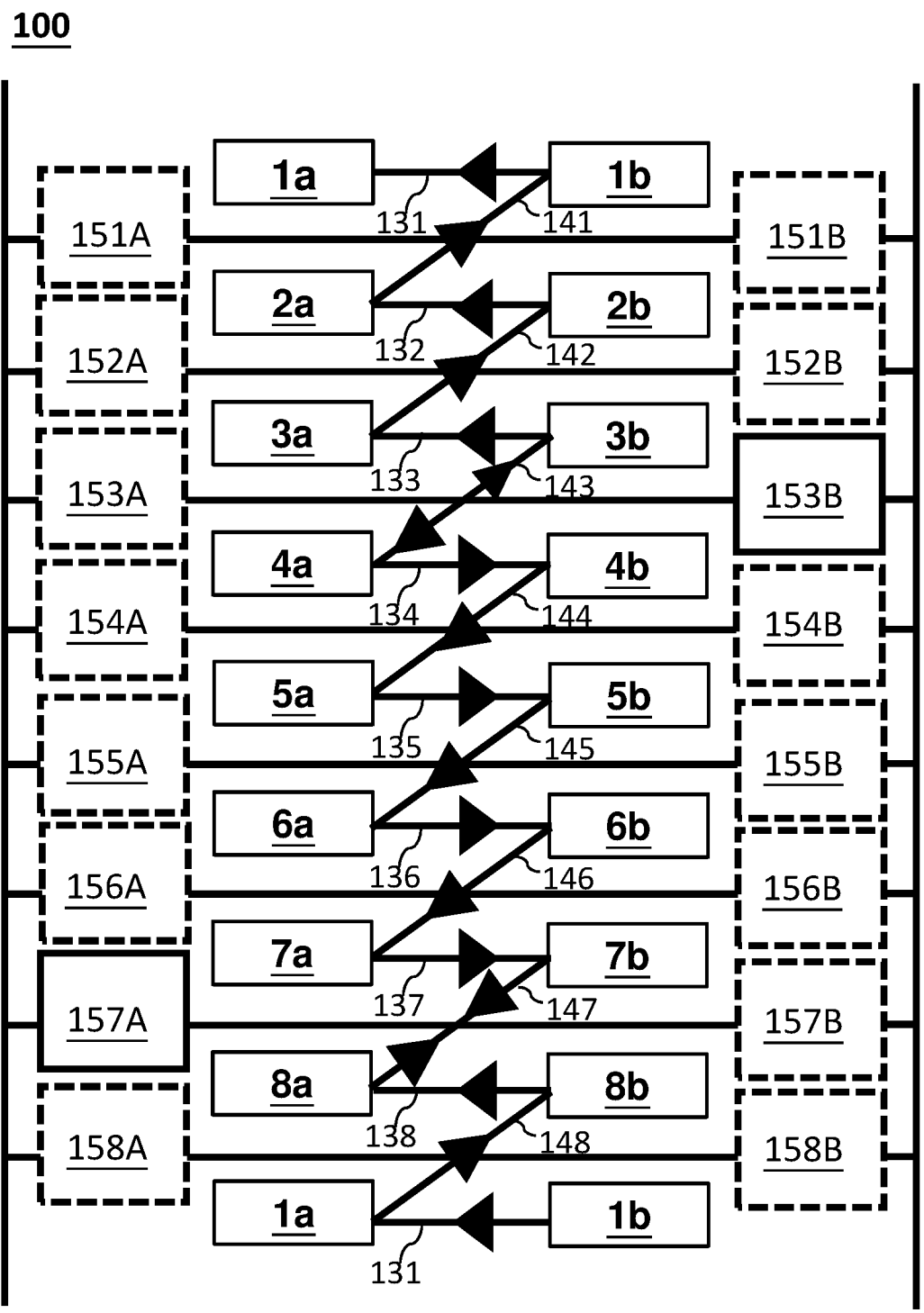
FIG. 5 is the equivalent circuit diagram corresponding to FIG. 2.

Next, please refer to FIG. 2 and FIG. 5. FIG. 5 is an equivalent circuit diagram corresponding to the FIG. 2. As shown in FIG. 5, when the 3rd second control switch 152B interconnecting between the second polarity DC power source 170 and the 3rd second wire 143 is switched on, the direction of the current within the 3rd second wire 143 will be inverted like a commutator is interconnected to the 3rd second wire 143, wherein the direction of the current in the fourth set of the first armature coil 4b will be changed from emitting out of the surface of the circular armature unit 110 to emitting into the surface of the circular armature unit 110, and the direction of the current in the fourth set of the second armature coil 4a will be changed from emitting out of the surface of the circular armature unit 110 to emitting into the surface of the circular armature unit 110. Similarly, as shown in FIG. 5, when the 7th first control switch 157A interconnecting between the first polarity DC power source 160 and the 7th second wire 147 is switched on, the direction of the current within the 7th second wire 147 will be inverted like a commutator is interconnected to the 7th second wire 147, wherein the direction of the current in the eighth set of the first armature coil 8b will be changed from emitting into the surface of the circular armature unit 110 to emitting out of the surface of the circular armature unit 110, and the direction of the current in the eighth set of the second armature coil 8a will be changed from emitting into the surface of the circular armature unit 110 to emitting out of the surface of the circular armature unit 110. Accordingly, the magnetic unit 120 shown in the FIG. 2 of this embodiment can rotate relatively to the circular armature unit 110 owing to the change of the torque.

Figure 3:
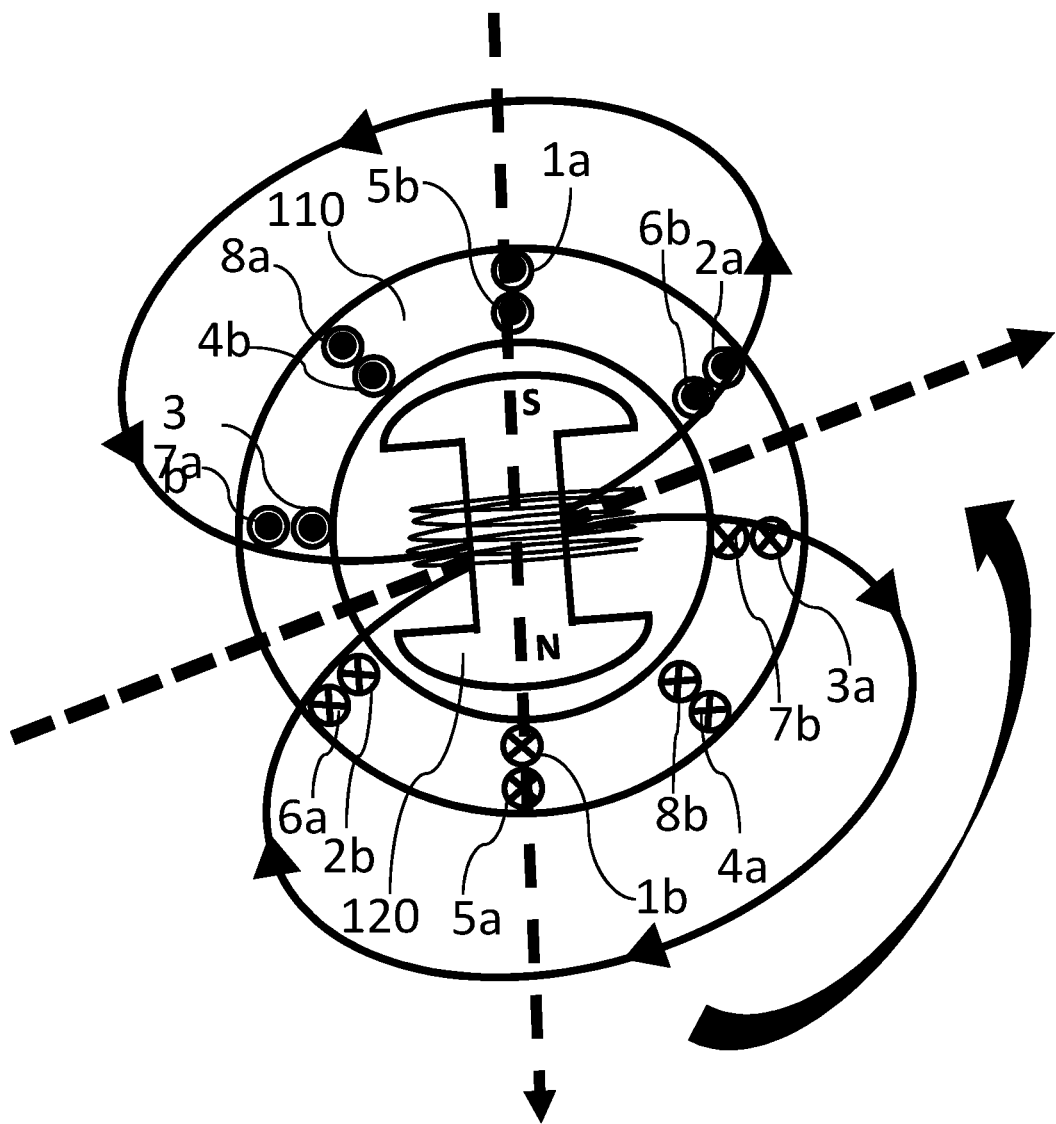
Figure 6:
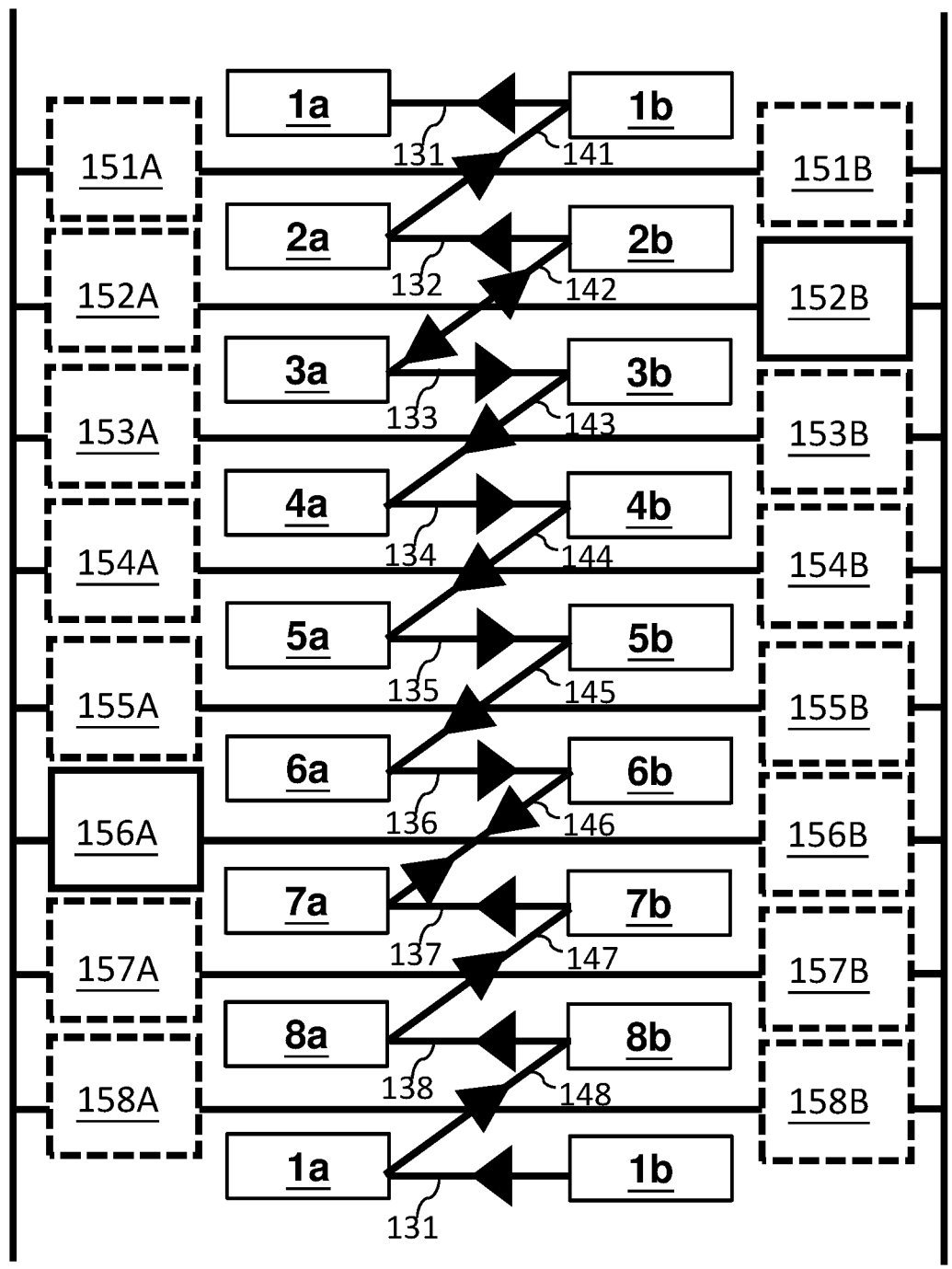
FIG. 6 is the equivalent circuit diagram corresponding to FIG. 3.

Next, please refer to FIG. 3 and FIG. 6. FIG. 6 is an equivalent circuit diagram corresponding to the FIG. 3. As shown in FIG. 6, when the 2nd second control switch 152B interconnecting between the second polarity DC power source 170 and the 2nd second wire 142 is switched on, the direction of the current within the 2nd second wire 142 will be inverted like a commutator is interconnected to the 2nd second wire 142, wherein the direction of the current in the third set of the first armature coil 3b will be changed from emitting out of the surface of the circular armature unit 110 to emitting into the surface of the circular armature unit 110, and the direction of the current in the third set of the second armature coil 3a will be changed from emitting out of the surface of the circular armature unit 110 to emitting into the surface of the circular armature unit 110. Similarly, as shown in FIG. 6, when the 6th first control switch 156A interconnecting between the first polarity DC power source 160 and the 7th second wire 147 is switched on, the direction of the current within the 6th second wire 146 will be inverted like a commutator is interconnected to the 6th second wire 146, wherein the direction of the current in the seventh set of the first armature coil 7b will be changed from emitting into the surface of the circular armature unit 110 to emitting out of the surface of the circular armature unit 110, and the direction of the current in the seventh set of the second armature coil 7a will be changed from emitting into the surface of the circular armature unit 110 to emitting out of the surface of the circular armature unit 110. Accordingly, the magnetic unit 120 shown in the FIG. 3 of this embodiment can rotate relatively to the circular armature unit 110 owing to the change of the torque.

Similarly, FIG. 3 is another schematic drawing of the dynamo 100 of the embodiment 1 according to this present invention, the directions of the current in the second wires (141~148) interconnect between the first armature coils (1b, 2b, 3b, 4b, 5b, 6b, 7b and 8b) and the second armature coils (1a, 2a, 3a, 4a, 5a, 6a, 7a and 8a) can continuously be changed by change the on and off stages of each of the first control switch (151A~158A) and each of the second control switch (151B~158B) like the dynamo 100 is equipped with conventional commutators, thus the torque applied to the magnetic unit 120 will also continuously be changed to act as a brushless DC dynamo.

Other embodiments according to this invention further comprise a first snubber (not shown) disposed between the first DC polarity power source 160 and the first control switches (151A~158A), and a second snubber disposed between the second DC polarity power source 170 and the second control switches (151B~158B).

Embodiment 2

Figure 7:
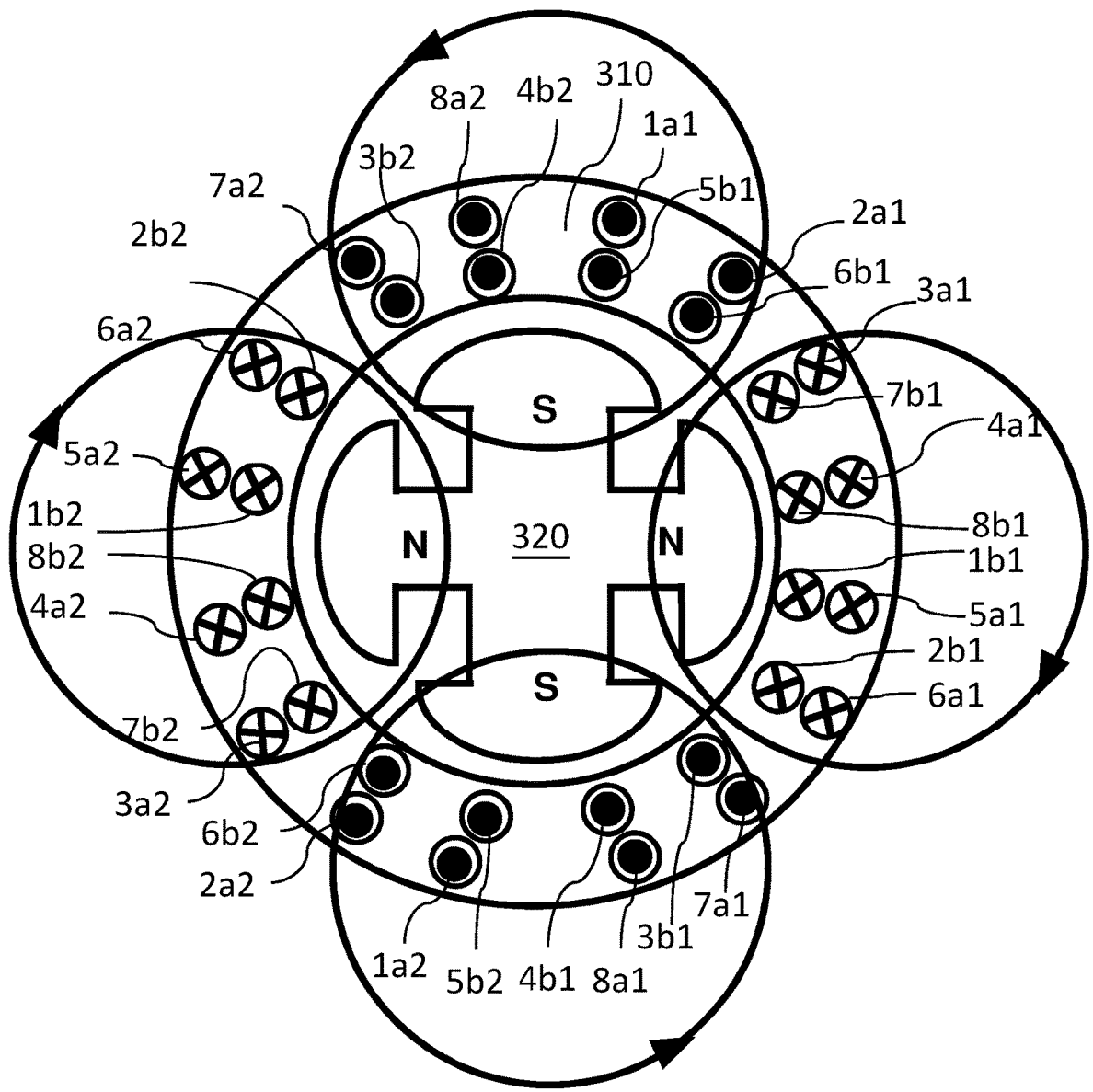
FIGS. 7~8 are schematic drawings of the dynamo 200 of the embodiment 2 according to this present invention on different operation stages.

Please refer to FIG. 7. As showing in FIG. 7, a brushless DC dynamo 300 of embodiment 2 according to this present invention is illustrated. The brushless DC dynamo 300 comprises a first circular armature 310 and a magnetic unit 320 consisted of a permanent magnet or an electromagnet, disposed inside the circular armature unit 300. The magnetic unit 320 comprises two pairs of magnetic poles, and the circular armature unit 310 and the magnetic unit 320 can rotate relatively to each other under control. In this embodiment, the magnetic unit 320 is a rotor and the circular armature 310 is a stator, so the magnetic unit 320 can rotate relatively to the circular armature 310 under control. In another embodiment of this invention, the magnetic unit 320 is a stator and the circular armature 310 is a rotor, so the circular armature 310 can rotate relatively to the magnetic unit 320. Besides, the first circular armature unit 310 comprises two second circular armature units interconnecting to each other.

As shown in FIG. 7, an armature coil with eight slots is taken as an example to explain this embodiment. The second circular armature unit 301 comprises 8 sets of first armature coils (1$b$1, 2$b$1, 3$b$1, 4$b$1, 5$b$1, 6$b$1, 7$b$1 and 8$b$1) spaced with each other in sequence and the first set of first armature coil 1$b$1 is adjacent to the 8th set of first armature coil 8$b$1 and joined with each other, and 8 sets of second armature coils (1$a$1, 2$a$1, 3$a$1, 4$a$1, 5$a$1, 6$a$1, 7$a$1 and 8$a$1) spaced with each other in sequence and the first set of second armature coil 1$a$2 is adjacent to the 8th set of second armature coil 8$a$2 and joined with each other, wherein eight sets of second armature coils (1$a$1, 2$a$1, 3$a$1, 4$a$1, 5$a$1, 6$a$1, 7$a$1 and 8$a$1) are located outside of the eight sets of first armature coils (1$b$1, 2$b$1, 3$b$1, 4$b$1, 5$b$1, 6$b$1, 7$b$1 and 8$b$1). The first armature coils (1$b$1, 2$b$1, 3$b$1, 4$b$1, 5$b$1, 6$b$1, 7$b$1 and 8$b$1) and the second armature coils (1$a$1, 2$a$1, 3$a$1, 4$a$1, 5$a$1, 6$a$1, 7$a$1 and 8$a$1) are manufactured by for example but not limited to wave winding, lap winding or frog-leg winding. Similarly, The second circular armature unit 302 comprises 8 sets of first armature coils (1$b$2, 2$b$2, 3$b$2, 4$b$2, 5$b$2, 6$b$2, 7$b$2 and 8$b$2) spaced with each other in sequence and the first set of first armature coil 1$b$2 is adjacent to the 8th set of first armature coil 8$b$2 and joined with each other, and 8 sets of second armature coils (1$a$2, 2$a$2, 3$a$2, 4$a$2, 5$a$2, 6$a$2, 7$a$2 and 8$a$2) spaced with each other in sequence and the first set of second armature coil 1$a$2 is adjacent to the 8th set of second armature coil 8$a$2 and joined with each other, wherein eight sets of second armature coils (1$a$2, 2$a$2, 3$a$2, 4$a$2, 5$a$2, 6$a$2, 7$a$2 and 8$a$2) are located outside of the eight sets of first armature coils (1$b$2, 2$b$2, 3$b$2, 4$b$2, 5$b$2, 6$b$2, 7$b$2 and 8$b$2). The first armature coils (1$b$2, 2$b$2, 3$b$2, 4$b$2, 5$b$2, 6$b$2, 7$b$2 and 8$b$2) and the second armature coils (1$a$2, 2$a$2, 3$a$2, 4$a$2, 5$a$2, 6$a$2, 7$a$2 and 8$a$2) are manufactured by for example but not limited to wave winding, lap winding or frog-leg winding. As shown in FIG. 7, the directions of current in the first armature coils (1$b$1, 2$b$1, 7$b$1, 8$b$1) of the second circular armature unit 301 and the directions of current in the first armature coils (1$b$2, 2$b$2, 7$b$2, 8$b$2) of the second circular armature unit 302 are emitted into the surface of the first circular armature unit 300, and the directions of current in the second armature coils (1$a$1, 2$a$1, 7$a$1, 8$a$1) of the second circular armature unit 301 and the directions of current in the second armature coils (1$a$2, 2$a$2, 7$a$2, 8$a$2) of the second circular armature unit 302 are emitted out of the surface of the first circular armature unit 300. The directions of current in the first armature coils (3$b$1, 4$b$1, 5$b$1, 6$b$1) of the second circular armature unit 301 and the directions of current in the first armature coils (3$b$2, 4$b$2, 5$b$2, 6$b$2) of the second circular armature unit 302 are emitted out of the surface of the first circular armature unit 300, and the directions of current in the second armature coils (3$a$1, 4$a$1, 5$a$1, 6$a$1) of the second circular armature unit 301 and the directions of current in the second armature coils (3$a$2, 4$a$2, 5$a$2, 6$a$2) of the second circular armature unit 302 are emitted out of the surface of the first circular armature unit 300.

In another embodiments of this invention, the second circular armature units 301 and 302 can respectively comprise N sets of second armature coils spaced with each other in sequence, and the first set of second armature coil is adjacent to the Nth set of second armature coil and joined with each other, wherein the N sets of second armature coils are located outside of the N sets of first armature coils; and a plurality of first wires and a plurality of second wires, and each first wire and each second wire respectively interconnecting between one set of the first armature coils and one set of the second armature coils; wherein, N is a natural number greater than 2, and the (i+1)th set of first armature coil is interconnected to the (i+1)th set of second armature coil by the (i+1)th first wire, and the (i+1)th set of first armature coil is interconnected to the (i+2)th set of second armature coil by the (i+1)th second wire, $1 \leq (i) \leq N-2$, and the first set of first armature coil is interconnected to the first set of second armature coil by the 1st first wire, and the first set of first armature coil is interconnected to the second set of second armature coil by the 1st second wire, and the Nth set of first armature coil is interconnected to the Nth set of second armature coil by the Nth first wire, and the Nth set of first armature coil is interconnected to the first set of first armature coil by the Nth second wire.

Figure 9:
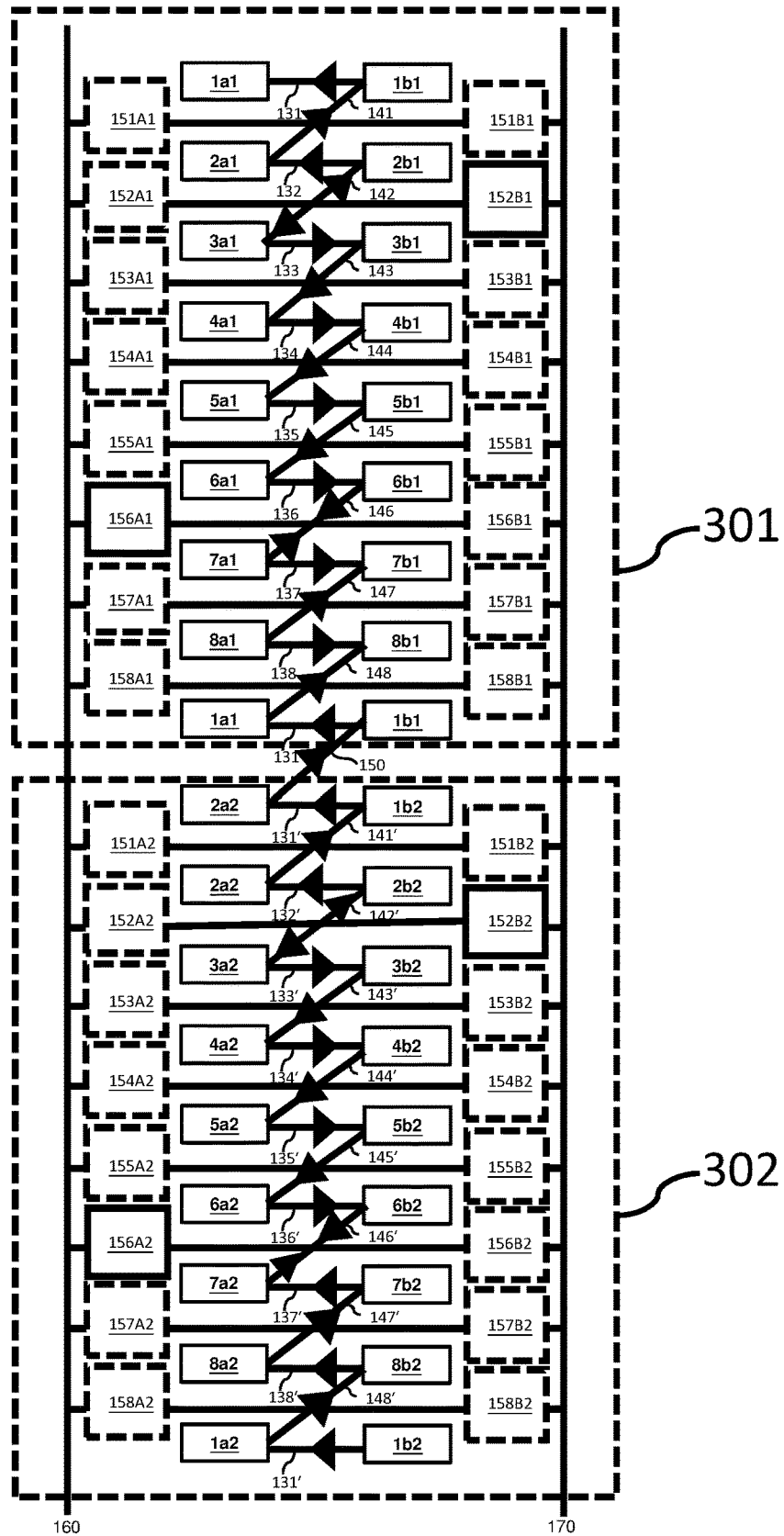
FIG. 9 is the equivalent circuit diagram corresponding to FIG. 7.

Next, please refer to FIG. 9 which is an equivalent circuit diagram corresponding to FIG. 7. As showing in FIG. 9, the brushless DC dynamo 300 further comprises a plurality of first wires 131~138 and a plurality of second wires 141~148, respectively interconnecting between the first armature coils (1$b$1, 2$b$1, 3$b$1, 4$b$1, 5$b$1, 6$b$1, 7$b$1 and 8$b$1) and the second armature coils (1$a$1, 2$a$1, 3$a$1, 4$a$1, 5$a$1, 6$a$1, 7$a$1 and 8$a$1) of the second circular armature unit 301, wherein the second set of first armature coil 2$b$1 is interconnected to the second set of second armature coil 2$a$1 by the 2nd first wire 132, and the second set of first armature coil 2$b$1 is interconnected to the third set of second armature coil 3$a$1 by the 2nd second wire 142; the third set of first armature coil 3$b$1 is interconnected to the third set of second armature coil 3$a$1 by the 3rd first wire 133, and the third set of first armature coil 3$b$1 is interconnected to the fourth set of second armature coil 4$a$1 by the 3rd second wire 143; the fourth set of first armature coil 4$b$1 is interconnected to the fourth set of second armature coil 4$a$1 by the 4th first wire 134, and the fourth set of first armature coil 4$b$1 is interconnected to the fifth set of second armature coil 5$a$1 by the 4th second wire 144; the fifth set of first armature coil 5$b$1 is interconnected to the fifth set of second armature coil 5$a$1 by the 5th first wire 135, and the fifth set of first armature coil 5$b$1 is interconnected to the sixth set of second armature coil 6$a$1 by the 5th second wire 145; the sixth set of first armature coil 6$b$1 is interconnected to the sixth set of second armature coil 6$a$1 by the 6th first wire 136, and the sixth set of first armature coil 6$b$1 is interconnected to the seventh set of second armature coil 7$a$1 by the 6th second wire 146; the seventh set of first armature coil 7$b$1 is interconnected to the seventh set of second armature coil 7$a$1 by the 7th first wire 137, and the seventh set of first armature coil 7$b$1 is interconnected to the eighth set of second armature coil 8$a$1 by the 7th second wire 147; the eighth set of first armature coil 8$b$1 is interconnected to the eighth set of second armature coil 8$a$1 by the 8th first wire 138, and the eighth set of first armature coil 8$b$1 is interconnected to the first set of second armature coil 1$a$2 by the 8th second wire 148.

Similarly, as showing in FIG. 9, the brushless DC dynamo 300 also comprises a plurality of first wires 131'~138' and a plurality of second wires 141'~148', respectively interconnecting between the first armature coils (1$b$2, 2$b$2, 3$b$2, 4$b$2, 5$b$2, 6$b$2, 7$b$2 and 8$b$2) and the second armature coils (1$a$2, 2$a$2, 3$a$2, 4$a$2, 5$a$2, 6$a$2, 7$a$2 and 8$a$2) of the second circular armature unit 302, wherein the second set of first armature coil 2$b$2 is interconnected to the second set of second armature coil 2$a$2 by the 2nd first wire 132', and the second set of first armature coil 2$b$2 is interconnected to the third set of second armature coil 3$a$2 by the 2nd second wire 142'; the third set of first armature coil 3$b$2 is interconnected to the third set of second armature coil 3$a$2 by the 3rd first wire 133', and the third set of first armature coil 3$b$2 is interconnected to the fourth set of second armature coil 4$a$2 by the 3rd second wire 143'; the fourth set of first armature coil 4$b$2 is interconnected to the fourth set of second armature coil 4a2 by the 4th first wire 134', and the fourth set of first armature coil 4b2 is interconnected to the fifth set of second armature coil 5a2 by the 4th second wire 144'; the fifth set of first armature coil 5b2 is interconnected to the fifth set of second armature coil 5a2 by the 5th first wire 135', and the fifth set of first armature coil 5b2 is interconnected to the sixth set of second armature coil 6a2 by the 5th second wire 145'; the sixth set of first armature coil 6b2 is interconnected to the sixth set of second armature coil 6a2 by the 6th first wire 136', and the sixth set of first armature coil 6b2 is interconnected to the seventh set of second armature coil 7a2 by the 6th second wire 146'; the seventh set of first armature coil 7b2 is interconnected to the seventh set of second armature coil 7a2 by the 7th first wire 137', and the seventh set of first armature coil 7b2 is interconnected to the eighth set of second armature coil 8a2 by the 7th second wire 147'; the eighth set of first armature coil 8b2 is interconnected to the eighth set of second armature coil 8a2 by the 8th first wire 138', and the eighth set of first armature coil 8b2 is interconnected to the first set of second armature coil 1a2 by the 8th second wire 148'. In addition, the second circular armature unit 301 is interconnected to the second circular armature unit 302 by a wire 150.

In addition, as shown in FIG. 9, the brushless DC dynamo can further comprises a control unit (not labeled) comprising eight first control switches 151A1~158A1 and eight second control switches 151B1~158B1 for controlling the second circular armature unit 301, and eight first control switches 151A2~158A2 and eight second control switches 151B2~158B2 for controlling the second circular armature unit 302.

As shown in FIG. 9, the first control switch 151A1 is interconnected between the first polarity DC power source 160 and the 1st second wire 141, and the 1st second control switch 151B1 is interconnected between the second polarity DC power source 170 and the 1st second wire 141; the second control switch 152A1 is interconnected between the first polarity DC power source 160 and the second second wire 142, and the second control switch 152B1 is interconnected between the second polarity DC power source 170 and the second second wire 142; the third control switch 153A1 is interconnected between the first polarity DC power source 160 and the 3rd second wire 143, and the 3rd second control switch 153B1 is interconnected between the second polarity DC power source 170 and the 3rd second wire 143; the fourth control switch 154A1 is interconnected between the first polarity DC power source 160 and the 4th second wire 144, and the 4th second control switch 154B1 is interconnected between the second polarity DC power source 170 and the 4th second wire 144; the fifth control switch 155A1 is interconnected between the first polarity DC power source 160 and the 5th second wire 145, and the 5th second control switch 155B1 is interconnected between the second polarity DC power source 170 and the 5th second wire 145; the sixth control switch 156A1 is interconnected between the first polarity DC power source 160 and the 6th second wire 146, and the 6th second control switch 156B1 is interconnected between the second polarity DC power source 170 and the 6th second wire 146; the seventh control switch 157A1 is interconnected between the first polarity DC power source 160 and the 7th second wire 147, and the 7th second control switch 157B1 is interconnected between the second polarity DC power source 170 and the 7th second wire 147; and the eighth control switch 158A1 is interconnected between the first polarity DC power source 160 and the 8th second wire 148, and the 8th second control switch 158B1 is interconnected between the second polarity DC power source 170 and the 8th second wire 148. The first polarity DC power source 160 and the second polarity DC power source 170 are of different polarities.

Similarly, As shown in FIG. 9, the first control switch 151A2 is interconnected between the first polarity DC power source 160 and the 1st second wire 141', and the 1st second control switch 151B2 is interconnected between the second polarity DC power source 170 and the 1st second wire 141'; the second control switch 152A2 is interconnected between the first polarity DC power source 160 and the second second wire 142', and the second control switch 152B2 is interconnected between the second polarity DC power source 170 and the second second wire 142'; the third control switch 153A2 is interconnected between the first polarity DC power source 160 and the 3rd second wire 143', and the 3rd second control switch 153B2 is interconnected between the second polarity DC power source 170 and the 3rd second wire 143'; the fourth control switch 154A2 is interconnected between the first polarity DC power source 160 and the 4th second wire 144', and the 4th second control switch 154B2 is interconnected between the second polarity DC power source 170 and the 4th second wire 144'; the fifth control switch 155A2 is interconnected between the first polarity DC power source 160 and the 5th second wire 145', and the 5th second control switch 155B2 is interconnected between the second polarity DC power source 170 and the 5th second wire 145'; the sixth control switch 156A2 is interconnected between the first polarity DC power source 160 and the 6th second wire 146', and the 6th second control switch 156B2 is interconnected between the second polarity DC power source 170 and the 6th second wire 146'; the seventh control switch 157A2 is interconnected between the first polarity DC power source 160 and the 7th second wire 147', and the 7th second control switch 157B2 is interconnected between the second polarity DC power source 170 and the 7th second wire 147'; and the eighth control switch 158A2 is interconnected between the first polarity DC power source 160 and the 8th second wire 148', and the 8th second control switch 158B2 is interconnected between the second polarity DC power source 170 and the 8th second wire 148'. The first polarity DC power source 160 and the second polarity DC power source 170 are of different polarities.

In another embodiments of this invention, each of the second circular armature units 301 and 302 comprises N sets of first armature coils spaced with each other in sequence and N sets of second armature coils spaced with each other, and the brushless DC dynamo 300 further comprises 2M control units, each control unit corresponding to one of the second circular armature units and comprising N first control switches and N second control switches, wherein the (j)th first control switch is interconnected between a first polarity DC power source and a (j)th second wire of a second circular armature unit corresponding to the (j)th first control switch, and the (j)th second control switch is interconnected between a second polarity DC power source with a polarity opposite to the first polarity DC power and a (j)th second wire of a second circular armature unit corresponding to the (j)th second control switch, wherein (j) is a natural number, and 1≤(j)≤N.

The brushless DC dynamo 300 further comprises a position sensor (not shown) for detecting the position of the magnetic unit 320, and outputting the information of magnetic unit's position to the control unit (not labeled) to trigger the control unit to output a control signal to control on or off of the first control switches (151A1~158A1; 151A2~158A2) and second control switches (151B1~158B1; 151B2~158B2). The position sensor can be a resolver, an encoder, a Hall sensor, a photo-interrupter or a photoelectric sensor.

As shown in FIG. 9, when the 2nd second control switch 152B1, 152B2 interconnecting between the second polarity DC power source 170 and the 2nd second wires 142, 142' are switched on, the directions of the current within the 2nd second wires 142, 142' will be inverted like commutators are interconnected to the 2nd second wires 142, 142, wherein the directions of the current in the second set of the first armature coil 2$b$1 of the second armature coil unit 301 will be changed from emitting out of the surface of the first circular armature unit 310 to emitting into the surface of the first circular armature unit 310, and the direction of the current in the third set of the second armature coil 3$a$1 of the second armature coil unit 301 will be changed from emitting out of the surface of the first circular armature unit 310 to emitting into the surface of the first circular armature unit 310; the directions of the current in the second set of the first armature coil 2$b$2 of the second armature coil unit 302 will be changed from emitting out of the surface of the first circular armature unit 310 to emitting into the surface of the first circular armature unit 310, and the direction of the current in the third set of the second armature coil 3$a$2 of the second armature coil unit 302 will be changed from emitting out of the surface of the first circular armature unit 310 to emitting into the surface of the first circular armature unit 310. Similarly, as shown in FIG. 9, when the 6th first control switch 156A1, 156A2 interconnecting between the first polarity DC power source 160 and the 6th second wires 146, 146' are switched on, the directions of the current within the 6th second wires 146, 146' will be inverted like a commutator is interconnected to the 6th second wires 146, 146' wherein the direction of the current in the sixth set of the first armature coil 6$b$1 of the second armature coil unit 301 will be changed from emitting into the surface of the first circular armature unit 310 to emitting out of the surface of the first circular armature unit 310, and the direction of the current in the seventh set of the second armature coil 7$a$2 of the second armature coil unit 302 will be changed from emitting into the surface of the first circular armature unit 310 to emitting out of the surface of the first circular armature unit 310. Accordingly, the magnetic unit 320 shown in the FIG. 7 of this embodiment can rotate relatively to the first circular armature unit 310 owing to the change of the torque.

Figure 8:
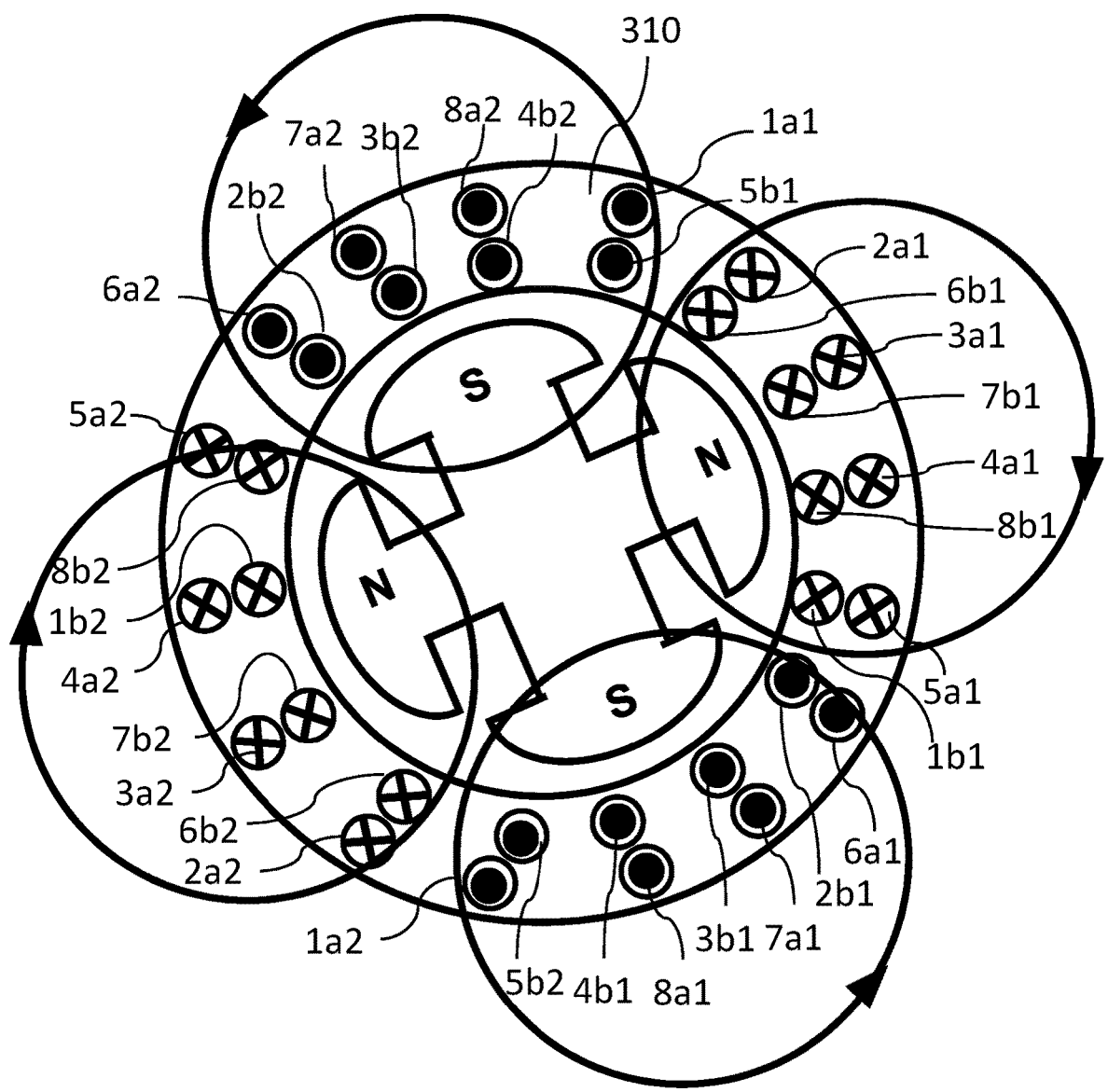
Figure 10:
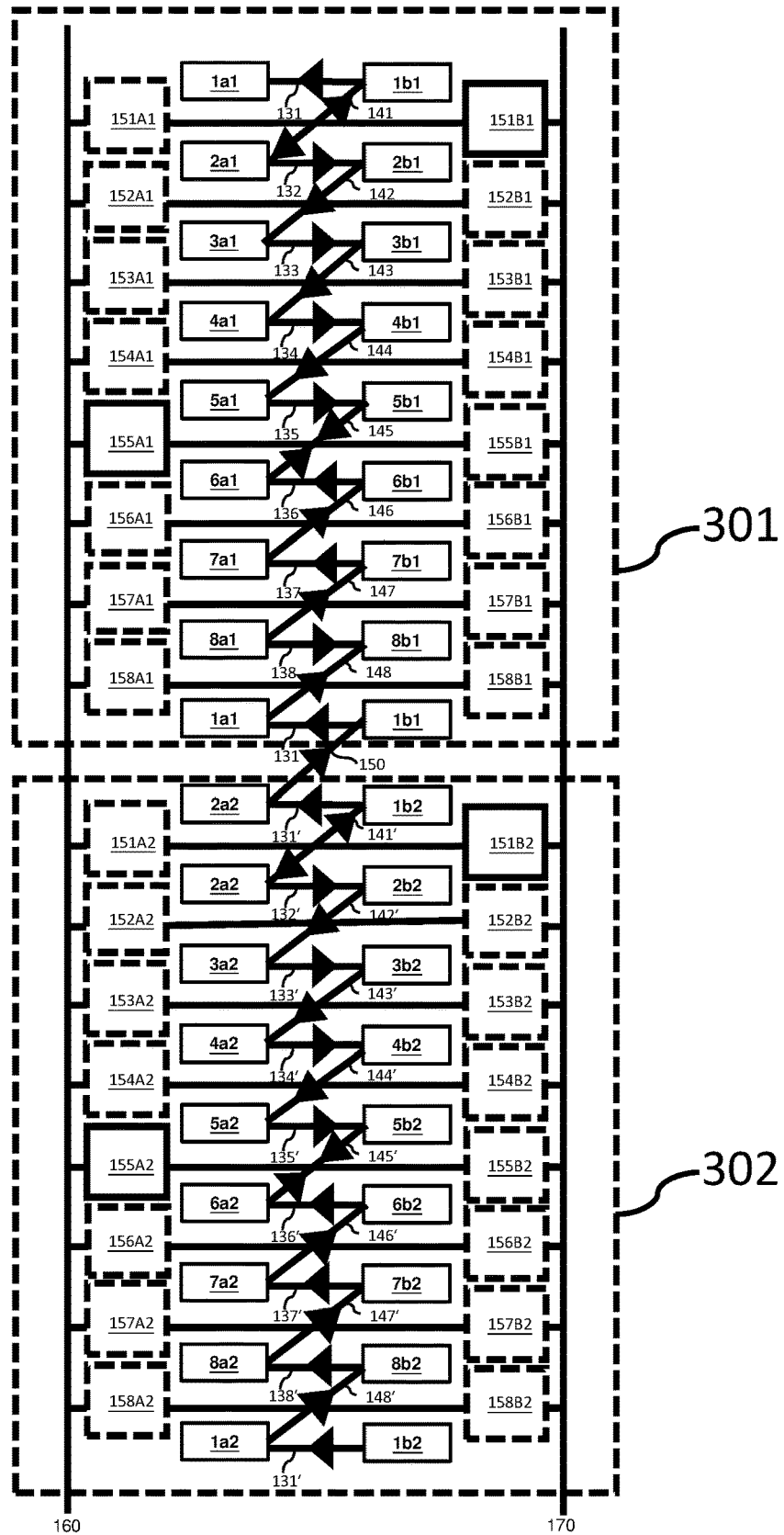
FIG. 10 is the equivalent circuit diagram corresponding to FIG. 8.

Next, please refer to FIG. 8 and FIG. 10. FIG. 10 is an equivalent circuit diagram corresponding to the FIG. 8. As shown in FIG. 10, when the 1st second control switch 151B1 interconnecting between the second polarity DC power source 170 and the 1st second wire 141 and the 1st second control switch 151B2 interconnecting between the second polarity DC power source 170 and the 1st second wire 141' are switched on, the directions of the current within the 1st second wire 141 and 141' will be inverted like commutators are interconnected to the 1st second wires 141 and 141', wherein the direction of the current in the first set of the first armature coil 1$b$1 of the second circular armature unit 301 will be changed from emitting out of the surface of the first circular armature unit 310 to emitting into the surface of the second circular armature unit 301 and the direction of the current in the second set of the second armature coil 2$a$1 of the second circular armature unit 301 will be changed from emitting out of the surface of the first circular armature unit 310 to emitting into the surface of the first circular armature unit 310; the direction of the current in the first set of the first armature coil 1$b$2 of the second circular armature unit 302 will be changed from emitting out of the surface of the first circular armature unit 310 to emitting into the surface of the first circular armature unit 310, and the direction of the current in the second set of the second armature coil 2$a$2 of the second circular armature unit 302 will be changed from emitting out of the surface of the first circular armature unit 310 to emitting into the surface of the first circular armature unit 310. Similarly, as shown in FIG. 10, when the 5th first control switch 155A1 interconnecting between the first polarity DC power source 160 and the 5th second wire 145 of the second circular armature unit 301 and the 5th first control switch 155A2 interconnecting between the first polarity DC power source 160 and the 5th second wire 141' of the second circular armature unit 302 are switched on, the directions of the current within the 5th second wires 145 and 145' will be inverted like commutators are interconnected to the 5th second wires 145 and 145', wherein the direction of the current in the fifth set of the first armature coil 5$b$1 of the first circular armature unit 301 will be changed from emitting into the surface of the first circular armature unit 301 to emitting out of the surface of the first circular armature unit 301 and the direction of the current in the sixth set of the second armature coil 6$a$1 of the first circular armature unit 301 will be changed from emitting into the surface of the first circular armature unit 301 to emitting out of the surface of the first circular armature unit 301; the direction of the current in the fifth set of the first armature coil 5$b$2 of the second circular armature unit 302 will be changed from emitting into the surface of the second circular armature unit 302 to emitting out of the surface of the second circular armature unit 302 and the direction of the current in the sixth set of the second armature coil 6$a$2 of the second circular armature unit 302 will be changed from emitting into the surface of the second circular armature unit 302 to emitting out of the surface of the second circular armature unit 302. Accordingly, the magnetic unit 320 shown in the FIG. 8 of this embodiment can rotate relatively to the circular armature unit 310 owing to the change of the torque.

Similarly, FIG. 8 is another schematic drawing of the dynamo 300 of the embodiment 2 according to this present invention, the directions of the current in the second wires (141~148; 141'~148') interconnect between the first armature coils (1$b$1, 2$b$1, 3$b$1, 4$b$1, 5$b$1, 6$b$1, 7$b$1 and 8$b$1; 1$b$2, 2$b$2, 3$b$2, 4$b$2, 5$b$2, 6$b$2, 7$b$2, 8$b$2) and the second armature coils (1$a$1, 2$a$1, 3$a$1, 4$a$1, 5$a$1, 6$a$1, 7$a$1 and 8$a$1; 1$a$2, 2$a$2, 3$a$2, 4$a$2, 5$a$2, 6$a$2, 7$a$2 and 8$a$2) can continuously be changed by change the on and off stages of each of the first control switch (151A~158A) and each of the second control switch (151B~158B) like the dynamo 300 is equipped with conventional commutators, thus the torque applied to the magnetic unit 320 will also continuously be changed to act as a brushless DC dynamo.

Other embodiments according to this invention further comprise a first snubber (not shown) disposed between the first DC polarity power source 160 and the first control switches (151A~158A; 151A'~158A'), and a second snubber disposed between the second DC polarity power source 170 and the second control switches (151B~158B; 151B1'~158B').

The invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A brushless DC dynamo, comprising:
   a circular armature, comprising:
   N sets of first armature coils spaced with each other in sequence, and the first set of first armature coil is adjacent to the Nth set of first armature coil and joined with each other;
   N sets of second armature coils spaced with each other in sequence, and the first set of second armature coil is adjacent to the Nth set of second armature coil and joined with each other, wherein the N sets of second armature coils are located outside of the N sets of first armature coils; and
   a plurality of first wires and a plurality of second wires, and each first wire and each second wire respectively interconnecting between one set of the first armature coils and one set of the second armature coils;
   wherein, N is a natural number greater than 2, and the (i+1)th set of first armature coil is interconnected to the (i+1)th set of second armature coil by the (i+1)th first wire, and the (i+1)th set of first armature coil is interconnected to the (i+2)th set of second armature coil by the (i+1)th second wire, $1 \leq (i) \leq N-2$, and the first set of first armature coil is interconnected to the first set of second armature coil by the 1st first wire, and the first set of first armature coil is interconnected to the second set of second armature coil by the 1st second wire, and the Nth set of first armature coil is interconnected to the Nth set of second armature coil by the Nth first wire, and the Nth set of first armature coil is interconnected to the first set of first armature coil by the Nth second wire;
   a control unit, comprising N first control switches and N second control switches, wherein the (j)th first control switch is interconnect between a first polarity DC power source and a (j)th second wire, and the (j)th second control switch is interconnected between a second polarity DC power source with a polarity opposite to the first polarity DC power and a (j)th second wire, wherein (j) is a natural number, and $1 \leq (j) \leq N$;
   a magnetic unit, disposed inside the circular armature unit, comprising a pair of magnetic poles, wherein the circular armature unit and the magnetic unit can rotate relatively to each other under control; and
   a position sensor for detecting the position of the magnetic unit, and outputting the information of magnetic unit's position to the control unit to trigger the control unit to output a control signal to control on or off of the first and second control switches.

2. The brushless DC dynamo as claimed in claim 1, wherein the magnetic unit is a permanent magnet or an electromagnet.

3. The brushless DC dynamo as claimed in claim 2, wherein the position sensor is a resolver, an encoder, a Hall sensor, a photo-interrupter or a photoelectric sensor.

4. The brushless DC dynamo as claimed in claim 3, further comprising a first snubber disposed between the first DC polarity power source and the first control switch, and a second snubber disposed between the second DC polarity power source and the second control switch.

5. The brushless DC dynamo as claimed in claim 1, wherein the first armature coils and the second armature coils are manufactured by wave winding, lap winding or frog-leg winding.

6. The brushless DC dynamo as claimed in claim 1, wherein the circular armature unit is a circular stator, and the magnetic unit is a magnetic rotor.

7. The brushless DC dynamo as claimed in claim 1, wherein the circular armature unit is a circular rotor, and the magnetic unit is a magnetic stator.

8. A brushless DC dynamo, comprising:
   a first circular armature unit, comprising M second circular armature units connected in series, M is a natural number no less than 2, and each second circular armature units comprising:
   N sets of first armature coils spaced with each other in sequence, and the first set of first armature coil is adjacent to the Nth set of first armature coil and joined with each other;
   N sets of second armature coils spaced with each other, and the first set of second armature coil is adjacent to the Nth set of second armature coil and joined with each other, wherein the N sets of second armature coils are located outside of the N sets of first armature coils; and
   a plurality of first wires and a plurality of second wires, and each first wire and each second wire respectively interconnecting between one set of the first armature coils and one set of the second armature coils;
   wherein, N is a natural number greater than 2, and the (i+1)th set of first armature coil is interconnected to the (i+1)th set of second armature coil by the (i+1)th first wire, and the (i+1)th set of first armature coil is interconnected to the (i+2)th set of second armature coil by the (i+1)th second wire, $1 \leq (i) \leq N-2$, and the first set of first armature coil is interconnected to the first set of second armature coil by the 1st first wire, and the first set of first armature coil is interconnected to the second set of second armature coil by the 1st second wire, and the Nth set of first armature coil is interconnected to the Nth set of second armature coil by the Nth first wire, and the Nth set of first armature coil is interconnected to the first set of first armature coil by the Nth second wire;
   2M control units, each control unit corresponding to one of the second circular armature units and comprising N first control switches and N second control switches, wherein the (j)th first control switch is interconnected between a first polarity DC power source and a (j)th second wire of a second circular armature unit corresponding to the (j)th first control switch, and the (j)th second control switch is interconnected between a second polarity DC power source with a polarity opposite to the first polarity DC power and a (j)th second wire of a second circular armature unit corresponding to the (j)th second control switch, wherein (j) is a natural number, and $1 \leq (j) \leq N$;
   a magnetic unit, disposed inside the first circular armature unit, comprising M pairs of magnetic poles, wherein the first circular armature unit and the magnetic unit can rotate relatively to each other under control; and
   a position sensor for detecting the position of the magnetic unit, and outputting the information of magnetic unit's position to the control unit to trigger the control unit to output a control signal to control on or off of the first and second control switches.

9. The brushless DC dynamo as claimed in claim 8, wherein the magnetic unit is a permanent magnet or an electromagnet.

10. The brushless DC dynamo as claimed in claim 9, wherein the position sensor is a resolver, an encoder, a Hall sensor, a photo-interrupter or a photoelectric sensor.

11. The brushless DC dynamo as claimed in claim 10, further comprising a first snubber disposed between the first DC polarity power source and the first control switches, and a second snubber disposed between the second DC polarity power source and the second control switches.

12. The brushless DC dynamo as claimed in claim 8, wherein the first armature coils and the second armature coils are manufactured by wave winding, lap winding or frog-leg winding.

13. The brushless DC dynamo as claimed in claim 12, wherein the first circular armature unit is a circular stator, and the magnetic unit is a magnetic rotor.

14. The brushless DC dynamo as claimed in claim 12, wherein the first circular armature unit is a circular rotor, and the magnetic unit is a magnetic stator.

* * * * *